(12) United States Patent
Ivans et al.

(10) Patent No.: US 11,577,835 B2
(45) Date of Patent: Feb. 14, 2023

(54) CARGO TRANSPORTING SYSTEMS FOR TAILSITTER AIRCRAFT

(71) Applicant: Textron Innovations Inc., Providence, RI (US)

(72) Inventors: Steven Ray Ivans, Ponder, TX (US); Brent Chadwick Ross, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 469 days.

(21) Appl. No.: 16/806,111

(22) Filed: Mar. 2, 2020

(65) Prior Publication Data
US 2021/0269154 A1   Sep. 2, 2021

(51) Int. Cl.
| | |
|---|---|
| *B64D 7/06* | (2006.01) |
| *B64D 7/08* | (2006.01) |
| *B64D 9/00* | (2006.01) |
| *B64C 29/02* | (2006.01) |

(52) U.S. Cl.
CPC ............... *B64D 7/06* (2013.01); *B64C 29/02* (2013.01); *B64D 7/08* (2013.01); *B64D 9/00* (2013.01)

(58) Field of Classification Search
CPC .............. B64D 7/08; B64D 1/04; B64D 9/00; B64D 7/06; B63G 8/30; B64C 29/02
See application file for complete search history.

(56) References Cited

U.S. PATENT DOCUMENTS

| | | | |
|---|---|---|---|
| 8,434,710 | B2 | 5/2013 | Hothi et al. |
| 9,676,488 | B2 | 6/2017 | Alber |
| 10,011,350 | B2 | 7/2018 | Scott et al. |
| 10,106,274 | B2 | 10/2018 | Alber et al. |
| 10,287,012 | B2 | 5/2019 | Robertson et al. |
| 10,407,169 | B2 | 9/2019 | Groninga et al. |
| 10,414,492 | B2 | 9/2019 | Robertson et al. |
| 2021/0129972 | A1* | 5/2021 | Sankrithi ................. B64D 9/00 |

* cited by examiner

*Primary Examiner* — Timothy D Collins
*Assistant Examiner* — Rodney M Henry
(74) *Attorney, Agent, or Firm* — Lawrence Youst PLLC

(57) ABSTRACT

A cargo transporting system for a tailsitter aircraft includes a cargo receptacle rotatably coupled to an underside of a wing and a cargo assembly selectively coupled to the cargo receptacle. By rotating the cargo receptacle, the cargo transporting system can transition between a deployed position and a retracted position. In the deployed position, the cargo receptacle is substantially perpendicular to the wing, and accommodates ground personnel charged with connecting or removing the cargo assembly from the cargo transporting system. In the retracted position, the cargo receptacle is substantially parallel to the wing, and positioned for flight operations.

18 Claims, 7 Drawing Sheets

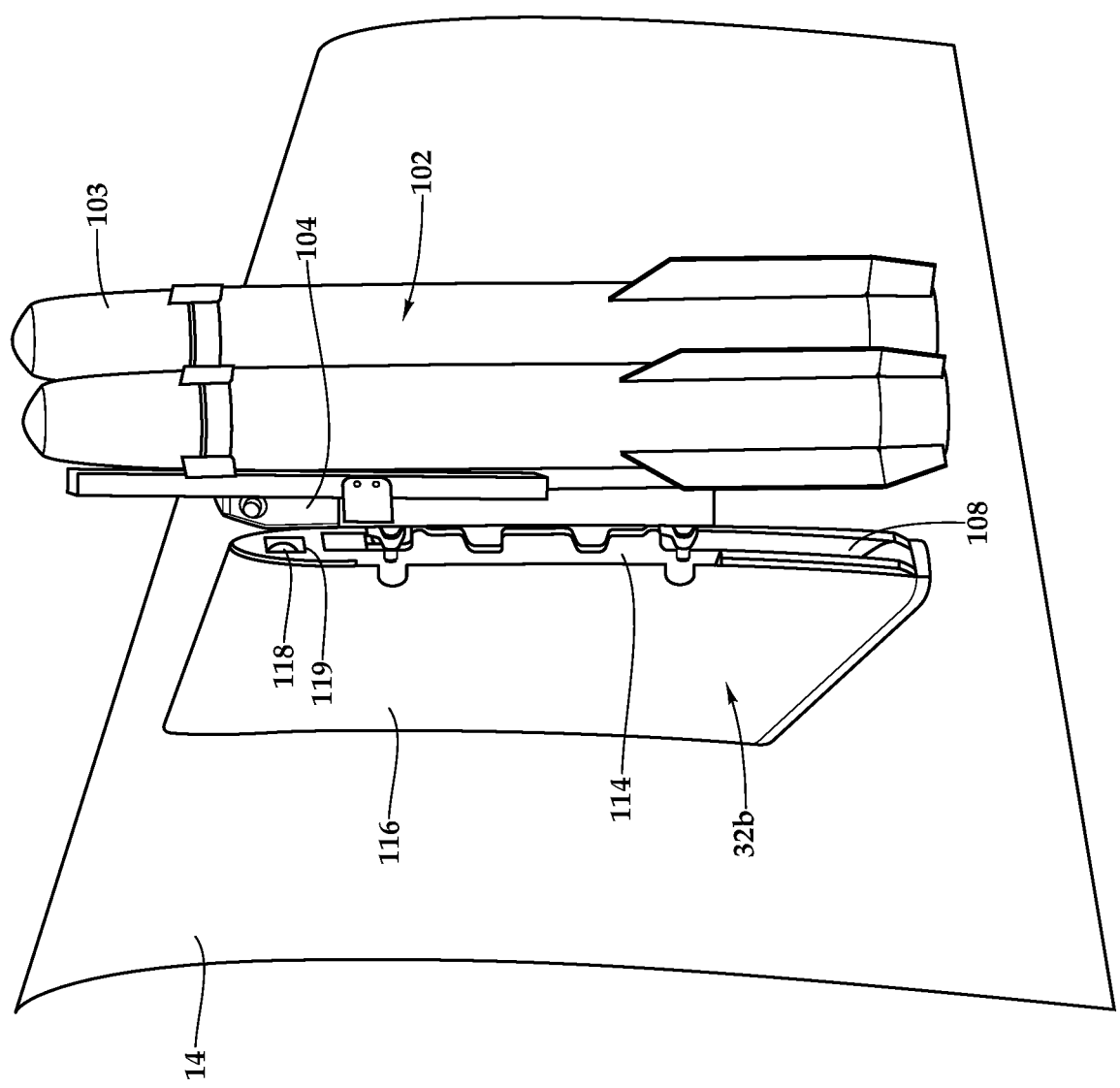

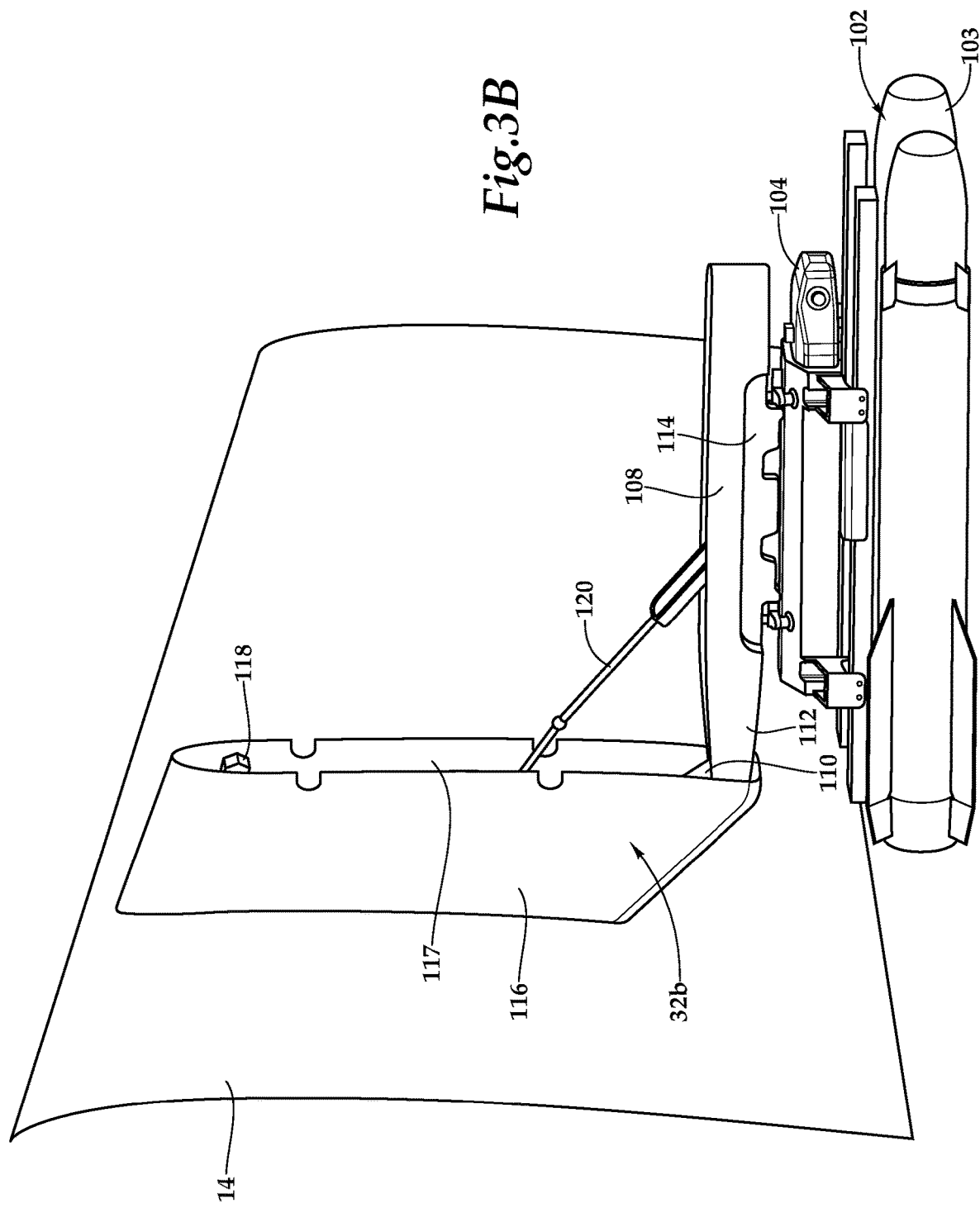

CARGO TRANSPORTING SYSTEMS FOR TAILSITTER AIRCRAFT

TECHNICAL FIELD OF THE DISCLOSURE

The present disclosure relates, in general, to tailsitter aircraft that have a vertical takeoff and landing flight mode and a forward flight mode and, in particular, to a cargo transporting system optimized for use on a tailsitter aircraft.

BACKGROUND

An example of an aircraft is a tailsitter aircraft. A tailsitter aircraft generally has a rotor system fixed relative to a body and wings. A tailsitter aircraft can operate in a vertical takeoff and landing or hover flight mode by vertically orienting its body and wings and pointing its rotor systems in an upright direction. In hover flight mode, the tailsitter aircraft generates a lifting force by rotating a plurality of rotor blades, which allows the tailsitter aircraft to make vertical takeoffs or vertical landings with little or no forward momentum. The tailsitter aircraft can also operate in a forward flight mode by horizontally orienting its body and wings and pointing its rotor systems in a forward direction. In forward flight mode, the tailsitter aircraft generates a lifting force by running an airflow over an aerodynamic wing surface, which allows the tailsitter aircraft to reach a greater forward airspeed than would otherwise be possible in hover flight mode.

A tailsitter aircraft can land by vertically orienting its body and wings and bringing its tail end in contact with a surface such as the ground or a top deck of an aircraft carrier. Once the tailsitter aircraft contacts the surface, cargo can be loaded onto the tailsitter aircraft. It has been found, however, that the vertical orientation of the body and wings of a tailsitter aircraft sitting on a surface makes traditional cargo loading operations difficult.

SUMMARY

In a first aspect, the present disclosure is directed to a cargo transporting system for a tailsitter aircraft with a loading configuration. In the loading configuration, the aircraft rests on a surface, such as the ground or a top deck of an aircraft carrier, and has its wing positioned in a substantially vertical orientation. The cargo transporting system includes a cargo receptacle and cargo assembly. The cargo receptacle is rotatably coupled to the underside of the wing and includes a cargo interface. The cargo interface selectively couples to a receptacle interface on the cargo assembly. While the aircraft is in the loading configuration, the cargo transporting system can transition between a deployed position and a retracted position. In the deployed position of the cargo transporting system, the cargo receptacle is substantially perpendicular to the wing. Conversely, in the retracted position of the cargo transporting system, the cargo receptacle is substantially parallel to the wing. While the cargo transporting system is in the deployed position, the cargo assembly can be connected to the cargo receptacle by coupling the receptacle interface of the cargo assembly with the cargo interface of the cargo receptacle such that the cargo assembly is substantially perpendicular to the wing. With the cargo assembly and cargo receptacle connected, the cargo transporting system can then transition from the deployed position into the retracted position in which the cargo assembly is substantially parallel to the wing.

In certain embodiments, in the deployed position of the cargo transporting system, a bottom surface of the cargo receptacle may rest above the surface such as between 2 feet and 4 feet above the surface. In other embodiments, the cargo receptacle may be configured to be selectively lowered from the retracted position of the cargo transporting system into the deployed position of the cargo transporting system and selectively raised from the deployed position of the cargo transporting system into the retracted position of the cargo transporting system. In certain embodiments, the cargo transporting system may include a rotating joint, which couples the cargo receptacle to the underside of the wing and selectively lowers and raises the cargo receptacle. In some embodiments, the cargo transporting system may include an integral tang assembly located at the rear end of the cargo receptacle that couples the cargo receptacle to the rotating joint. In other embodiments, the rotating joint may include a joint lock that can lock the cargo receptacle in a position substantially perpendicular with the wing, when the cargo transporting system is in the deployed position.

In certain embodiments, the cargo transporting system may include a hinged arm, coupled to both the underside of the wing and the cargo receptacle, that can exert a force to control the rate of rotation of the cargo receptacle. In some embodiments, the hinged arm may support the weight of the cargo receptacle, when the cargo transporting system is in the deployed position. In other embodiments, the cargo transporting system may include a housing structure with a housing aperture coupled to the underside of the wing that houses a top surface of the cargo receptacle within the housing aperture and allows the bottom surface of the cargo receptacle to rest outside the housing aperture. In certain embodiments, the cargo transporting system may include a lock assembly that can lock the cargo receptacle in a position substantially parallel with the wing, when the cargo transporting system is in the retracted position. In some embodiments, the lock assembly may include a lock aperture located on the cargo receptacle and a lock mechanism coupled to the underside of the wing that can interact with the lock aperture to lock the cargo receptacle in a substantially vertical orientation parallel with the wing, when the cargo transporting system is in the retracted position. In other embodiments, the cargo assembly may include a weapon system with a projectile configured to selectively propel itself from a first location to a second location.

In a second aspect, the present disclosure is directed to a tailsitter aircraft with a loading configuration including a wing, a pylon, a tail assembly and a first cargo transporting system. In the loading configuration, the tail assembly rests on a surface, such as the ground or a top deck of an aircraft carrier, and the wing, pylon and tail assembly are positioned in a substantially vertical orientation. The first cargo transporting system includes a first cargo receptacle and first cargo assembly. The first cargo receptacle is rotatably coupled to the underside of the wing and includes a first cargo interface. The first cargo interface selectively couples to a receptacle interface on the first cargo assembly. While the aircraft is in the loading configuration, the first cargo transporting system can transition between a deployed position and a retracted position. In the deployed position of the first cargo transporting system, the first cargo receptacle is substantially perpendicular to the wing. Conversely, in the retracted position of the first cargo transporting system, the first cargo receptacle is substantially parallel to the wing. While the first cargo transporting system is in the deployed position, the first cargo assembly can be connected to the first cargo receptacle by coupling the receptacle interface of the first cargo assembly with the first cargo interface of the first cargo receptacle such that the first cargo assembly is substantially perpendicular to the wing. With the first cargo assembly and first cargo receptacle connected, the first cargo transporting system can then transition from the deployed position into the retracted position in which the first cargo assembly is substantially parallel to the wing.

In certain embodiments, the aircraft may include a second cargo transporting system that is substantially similar to the first cargo transporting system having a deployed position and a retracted position. In some embodiments, the first cargo transporting system and the second cargo transporting system may be symmetrically oriented about a central axis through the center width of the aircraft. In other embodiments, the first cargo transporting system and second cargo loading may simultaneously transition from their respective retracted positions to their respective deployed positions and may simultaneously transition from their respective deployed positions to their respective retracted positions.

In a third aspect, the present disclosure is directed to a method for using an instrument system in communication with a cargo transporting system on an aircraft. A user first sends a signal to the instrument system, which then determines whether the cargo transporting system is in a retracted position, with a cargo receptacle in a substantially vertical orientation, or a deployed position, with the cargo receptacle in a substantially horizontal orientation. If the cargo transporting system is in the retracted position, the instrument system commands the cargo transporting system to transition to the deployed position. If the cargo transporting system is in the deployed position, the instrument system commands the cargo transporting system to transition to the retracted position.

In certain embodiments, the method may include an additional step wherein the instrumentation determines whether the aircraft in a loading configuration, safety sitting on a surface in a substantially vertical orientation. If the aircraft is not in a loading configuration, then an error message is sent to the user and the cargo transporting system is prevented from transitioning between the retracted and deployed positions.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3B are oblique views of a cargo transporting system in retracted mode and in deployed mode, respectively, in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation can be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference can be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein can be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein can be oriented in any desired direction. In addition, as used herein, the term "coupled" can include direct or indirect coupling by any means, including moving and/or non-moving mechanical connections.

Figure 1B:
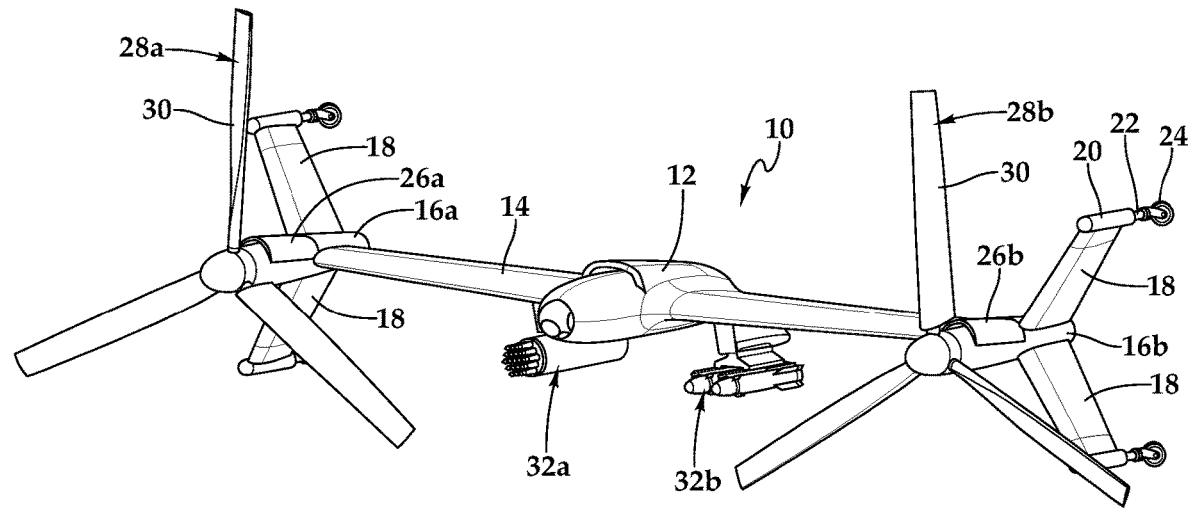
FIGS. 1A-1B are schematic illustrations of a tailsitter aircraft in vertical takeoff and landing or hover flight mode and in forward flight mode, respectively, in accordance with embodiments of the present disclosure.
Figure 1A:
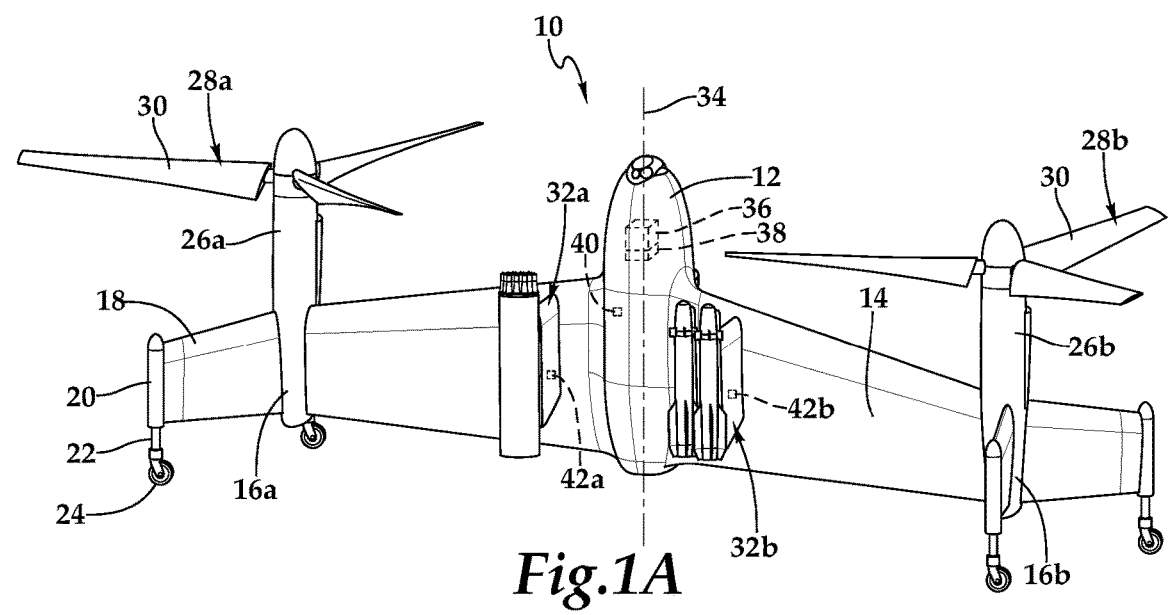

Referring to FIGS. 1A-1B in the drawings, a tailsitter aircraft 10 is schematically illustrated. Aircraft 10 includes a fuselage 12, a wing 14 and pylon assemblies 26a, 26b. The pylon assemblies 26a, 26b are located at the outboard ends of the wing 14. The fuselage 12, wing 14 and pylon assemblies 26a, 26b can be oriented in a generally vertical orientation, as best seen in FIG. 1A, and a generally horizontal orientation, as best seen in FIG. 1B. Pylon assemblies 26a, 26b include rotor assemblies 28a, 28b respectively; wherein, rotor assemblies 28a, 28b include a plurality of rotor blades 30. Situated along the bottom of the pylon assemblies 26a, 26b are tail assemblies 16a, 16b respectively; wherein tail assemblies 16a, 16b include a plurality of outward extending winglets 18 that are symmetrically oriented about the outboard width of the wing 14. Located proximate to the outboard ends of each winglet 18 is a landing gear assembly 20, which includes a landing gear strut 22 and a landing gear wheel 24. Cargo transporting systems 32a, 32b are coupled to the underside of the wing 14 and symmetrically oriented about a center axis 34 through the center of the aircraft 10. In FIGS. 1A-1B, the cargo transporting systems 32a, 32b are parallel to the surface of the wing 14 and are designed to load and carry cargo onto aircraft 10. The cargo transporting systems 32a, 32b are shown carrying cargo in the form of weapon modules, but it should be noted that cargo transporting systems 32a, 32b can also carry other forms of cargo including, but not limited to, sensor modules, communications modules, air reconnaissance modules, intelligence modules as well as packages, luggage, parcels or any combination or permutation thereof.

Aircraft 10 includes a flight control system 36 that is preferably a redundant digital flight control system including multiple independent flight control computers. For example, the use of a triply redundant flight control system 36 improves the overall safety and reliability of aircraft 10 in the event of a failure in flight control system 36. Aircraft 10 may be a manned or unmanned aircraft and flight control system 36 may operate responsive to pilot flight control, remote flight control, autonomous flight control or any combination or permutation thereof. Flight control system 36 preferably includes non-transitory computer readable storage media including a set of computer instructions executable by one or more processors for controlling the operation of aircraft 10. Flight control system 36 may be implemented on one or more general-purpose computers, special purpose computers or other machines with memory and processing capability. For example, flight control system 36 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 36 may be a microprocessor-based system operable to execute program code in the form of machine-executable instructions. In addition, flight control system 36 may be selectively connectable to other computer systems via a proprietary encrypted network, a public encrypted network, the Internet or other suitable communication network that may include both wired and wireless connections.

Aircraft 10 includes one or more control modules such as an instrument system 38 that may be integral with or independent of flight control system 36. Instrument system 38 is in communication with one or more sensors, such sensor 40 to determine whether aircraft 10 is resting on a surface and sensors 42a, 42b to determine the position of the cargo transporting systems 32a, 32b. Instrument system 38 is configured to receive a signal to individually and independently control and operate the cargo transporting systems 32a, 32b or to collectively control and operate the cargo transporting systems 32a, 32b, as discussed herein.

FIG. 1A illustrates aircraft 10 in a hover flight mode, in which the rotor assemblies 28a, 28b are oriented in a substantially horizontal plane to provide a lifting thrust such that aircraft 10 flies much like a conventional helicopter. In hover flight mode, the fuselage 12, wing 14 and pylon assemblies 26a, 26b are vertically oriented. Additionally, in hover flight mode, the aircraft 10 can make vertical landings and vertical takeoffs that require little or no forward momentum and bring the tail assemblies 16a, 16b into contact a suitable surface such as the ground or a top deck of an aircraft carrier. Once the tail assemblies 16a, 16b contact the surface, the weight of the aircraft 10 can be partially or fully supported by the landing gear assemblies 20.

FIG. 1B illustrates aircraft 10 in a forward flight mode, in which the rotor assemblies 28a, 28b are oriented in a substantially vertical plane to provide a forward thrust enabling wing 14 to provide a lifting force responsive to forward airspeed, such that aircraft 10 flies much like a conventional propeller driven aircraft. In forward flight mode, the fuselage 12, wing 14 and pylon assemblies 26a, 26b are horizontally oriented. Additionally, in forward flight mode, the aircraft 10 can reach greater forward airspeeds than would otherwise be possible in hover flight mode.

Figure 2B:
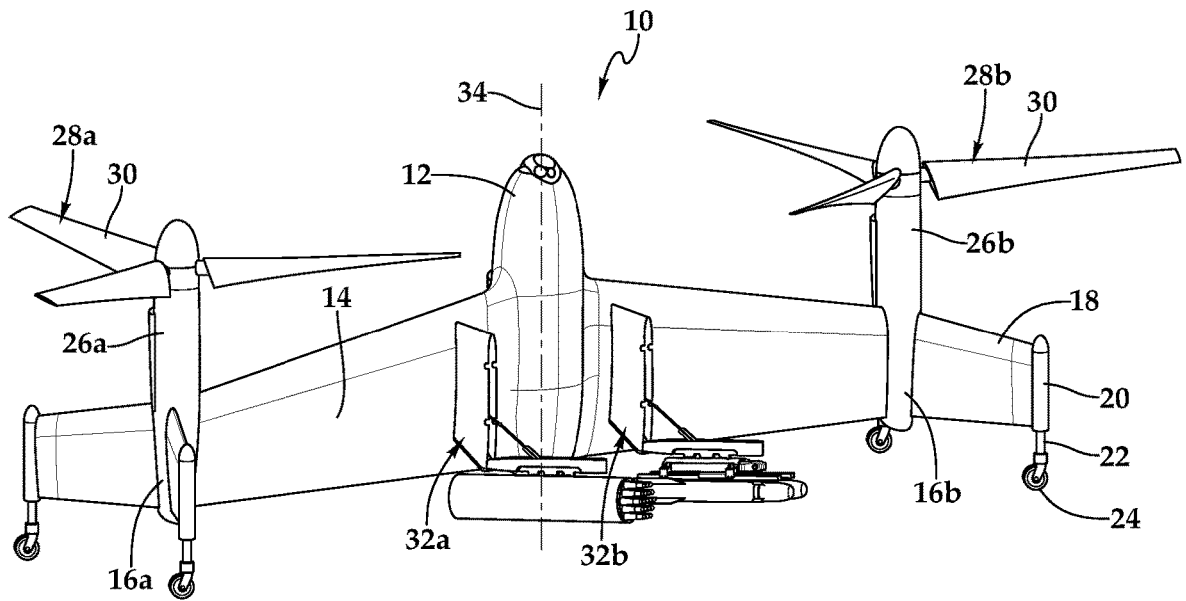
FIGS. 2A-2B are schematic illustrations of a tailsitter aircraft in a loading configuration with a cargo transporting system in deployed mode and in retracted mode, respectively, in accordance with embodiments of the present disclosure.
Figure 2A:
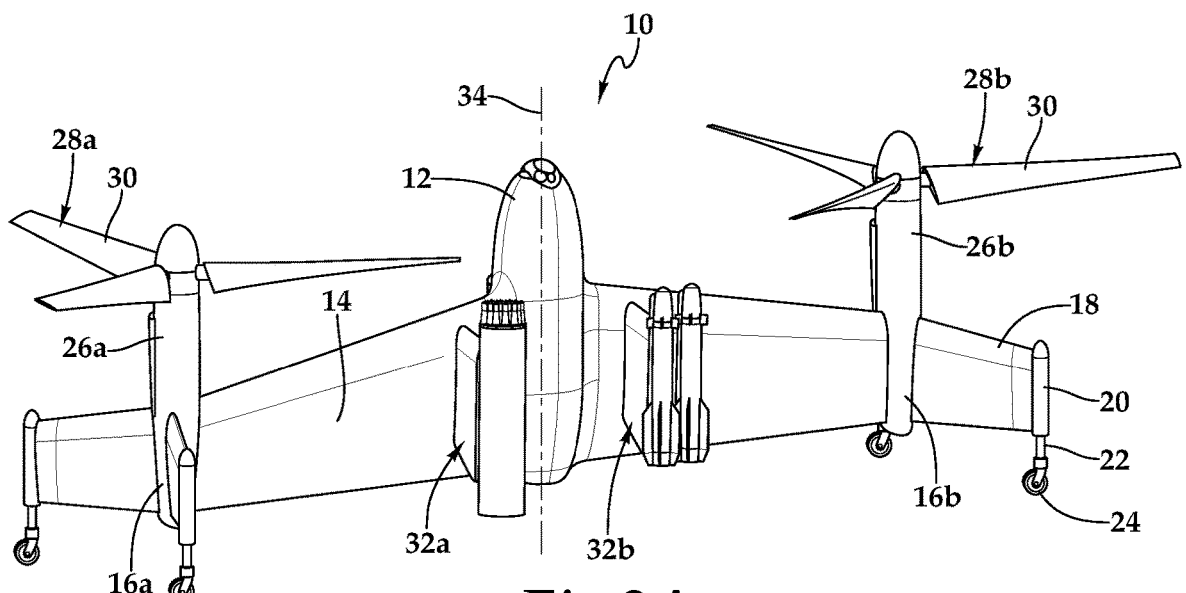

FIGS. 2A-2B illustrate aircraft 10 in a loading configuration. In the loading configuration, the fuselage 12, wing 14, and pylon assemblies 26a, 26b are vertically oriented and tail assemblies 16a, 16b are in contact with a surface. While in the loading configuration, cargo transporting systems 32a, 32b can transition between a retracted position and a deployed position. In the retracted position, the cargo transporting systems 32a, 32b are generally vertically oriented parallel with the wing 14, as best seen in FIG. 2A. In the deployed position, the cargo transporting systems 32a, 32b are generally horizontally oriented perpendicular with the wing 14, as best seen in FIG. 2B. Cargo transporting systems 32a, 32b can either transition individually or synchronously with one another.

It should be noted that as the cargo transporting systems 32a, 32b transition between the retracted position and the deployed position, the weight of the cargo transporting systems 32a, 32b will cause the center of gravity (CG) of the aircraft 10 to shift. If left unchecked, the shifting CG of the aircraft 10 could cause the aircraft 10 to become unbalanced and/or unstable. To prevent a tip over risk, the aircraft 10 has a large rectangular profile base formed by the four landing gear assemblies 20 of the tail assemblies 16a, 16b. The large rectangular profile base can accommodate the shifting CG of aircraft 10, as the cargo transporting systems 32a, 32b transition between the retracted position and the deployed position. Even though aircraft 10 has been depicted and described as having two cargo transporting systems, it should be understood by those having ordinary skill in the art that an aircraft of the present disclosure could have any number of cargo transporting systems both less than or greater than two including one, three, four or more cargo transporting systems.

FIG. 2A illustrates aircraft 10 in the loading configuration with its cargo transporting systems 32a, 32b in a retracted position. In the retracted position, the cargo transporting systems 32a, 32b are held generally or substantially parallel to the underside of the wing 14. From the retracted position, the cargo transporting systems 32a, 32b can transition downward into the deployed position. Additionally, when the cargo transporting systems 32a, 32b are in the retracted position, the aircraft 10 can transition from the loading configuration to hover flight mode by rotating the rotor assemblies 28a, 28b and lifting the aircraft 10 off the surface.

FIG. 2B illustrates aircraft 10 in the loading configuration with its cargo transporting systems 32a, 32b in the deployed position. In the deployed position, the cargo transporting systems 32a, 32b extend outward from and are held generally or substantially perpendicular to the underside of wing 14. In the illustrated embodiment, while in the deployed position, the cargo transporting systems 32a, 32b are held between two feet and four feet above the surface to accommodate ground personnel charged with loading cargo on or unloading cargo from the cargo transporting systems 32a, 32b. From the deployed position, the cargo transporting systems 32a, 32b can transition upward to the retracted position. Once in the retracted position, the aircraft 10 can then transition from the loading configuration to hover flight mode.

FIGS. 3A-3B illustrate oblique views of the cargo transporting system 32b. It should be noted that the below discussion of the cargo transporting system 32b is applicable to the cargo transporting system 32a. The cargo transporting system 32b includes a cargo receptacle 108 and rotating joint 110; wherein the cargo receptacle 108 includes a pair of integral tangs 112 along its rear end and a cargo interface 114 along its bottom surface. The cargo receptacle 108 is coupled to the rotating joint 110 by the pair of integral tangs 112. The rotating joint 110, in turn, is fixed to the underside of the wing 14 and couples the cargo receptacle 108 to the wing 14. The rotating joint 110 can selectively rotate the cargo receptacle 108 in place as the cargo transporting system 32b transitions between the retracted position, as seen in FIG. 3A, and the deployed position, as seen in FIG. 3B. The rotating joint 110 may include an electromechanical actuator that is operated responsive to commands from the instrument system 38 for controlling operation of the cargo receptacle 108. Additionally, the rotating joint 110 includes a joint lock to selectively lock the cargo receptacle 108 in place, when the cargo transporting system 32b is in either the retracted position or the deployed position.

A housing structure 116 surrounds the rotating joint 110 and is fixed to the underside of the wing 14. The housing structure 116 includes a housing aperture 117 that at least partially receives the cargo receptacle 108 therethrough such that housing structure 116 shields the top and side surfaces of the cargo receptacle 108, while the cargo transporting system 32b is in the retracted position. Within the housing aperture 117 is a lock mechanism 118 fixed to the underside of the wing 14 or housing structure 116. While the cargo transporting system 32b is in the retracted position, the lock mechanism 118 can interact with a lock aperture 119 located near an upper end of the cargo receptacle 108 when cargo transporting system 32b is in the retracted position. Fixed near the center of the housing aperture 117 is a hinged arm 120. At one end, the hinged arm 120 is fixed to the underside of the wing 14 or housing structure 116 and at the other end, the hinged arm 120 is fixed to the middle section of the cargo receptacle 108. The mid-body of the hinged arm 120 is hinged and can fold in on itself. The hinged arm 120 may include an electromechanical actuator that is operated responsive to commands from the instrument system 38 for controlling operation of the cargo receptacle 108 that may work together with or instead of the actuator associated with the rotating joint 110. For example, the hinged arm 120 can exert a force to control the rate of rotation of the cargo receptacle 108, as the cargo transporting system 32b transitions between the retracted position and the deployed position. While the cargo transporting system 32b is in the retracted position, the hinged arm 120 is folded and housed in the housing structure 116, out of view in FIG. 3A. While the cargo transporting system 32b is in the deployed position, the hinged arm 120 extends outside of the housing structure 116 in a diagonally downward direction from the underside of the wing 14 to the mid-section of the cargo receptacle 108, as seen in FIG. 3B. In other embodiments, a tension cable could be used in place of or in addition to hinged arm 120 to assist during the retracting and/or deploying of cargo transporting system 32b as well as to support cargo transporting system 32b in the deployed position. In some embodiments, operation of the cargo transporting system 32b between the retracted position and the deployed position may be a manual process. In such embodiments, an air shock or spring may be used to assist the manual retracting and/or deploying of cargo transporting system 32b.

The cargo interface 114, located along the bottom surface of the cargo receptacle 108, selectively fixes a cargo assembly 122 to the cargo receptacle 108. In FIGS. 3A-3B, the cargo assembly takes the form of a missile system 102, but the cargo interface 114 can also selectively fix other forms of cargo assemblies as discussed herein to the cargo receptacle 108. The missile system 102 includes a projectile in the form of missiles 103 that are designed to propel themselves from the aircraft 10 to a selected target. The missiles 103 may include fuel systems, guidance systems, explosive ordinances and other elements which are not shown in the figures. Additionally, the missile system 102 includes an ejector rack 104. The top of the ejector rack 104 interacts directly with the cargo interface 114 to fix the missile system 102 to the cargo transporting system 32b. In turn, the bottom of the ejector rack 104 holds and selectively releases the missile 103.

FIG. 3A illustrates the cargo transporting system 32b in the retracted position. In the illustrated embodiment, the cargo receptacle 108 and the missile system 102 are vertically oriented parallel with the wing 14. Additionally, while the cargo transporting system 32b is in the retracted position, the side surfaces of the cargo receptacle 108 are partially flush with the housing structure 116; and the housing aperture 117 is partially filled by the cargo receptacle 108. Additionally, the lock mechanism 118 interacts with the lock aperture 119 to lock the cargo receptacle 108 in a vertical orientation parallel to the wing 14. The rotating joint 110 can also work in conjunction with the lock mechanism 118 to lock the cargo receptacle 108 in place. The bottom surface of the cargo receptacle 108 and the cargo interface 114 remain outside the housing structure 116; and the cargo interface 114 fixes the missile system 102 to the cargo receptacle 108.

FIG. 3B illustrates the cargo transporting system 32b in the deployed position. In the illustrated embodiment, the cargo receptacle 108 and the missile system 102 are horizontally oriented perpendicular with the wing 14. Apart from a portion of the integral tangs 112, most the cargo receptacle 108 rests outside of the housing structure 116. Additionally, the cargo receptacle 108 is suspended between two and four feet above the ground. While the cargo transporting system 32b is in the deployed position, the rotating joint 110 locks the cargo receptacle 108 in a horizontal orientation perpendicular to the wings. The hinged arm 120 unfolds outward from the housing structure 116 and is primarily used to control the rate of rotation of the cargo receptacle 108 as the cargo transporting system 32b transitions between the retracted and deployed position; however, the hinged arm 120 may also partially support the weight of cargo receptacle 108, while the cargo transporting system 32b is in the deployed position. While the cargo transporting system 32b is in the deployed position, ground personnel can load and unload a cargo assembly onto the cargo interface 114.

Figure 4A:
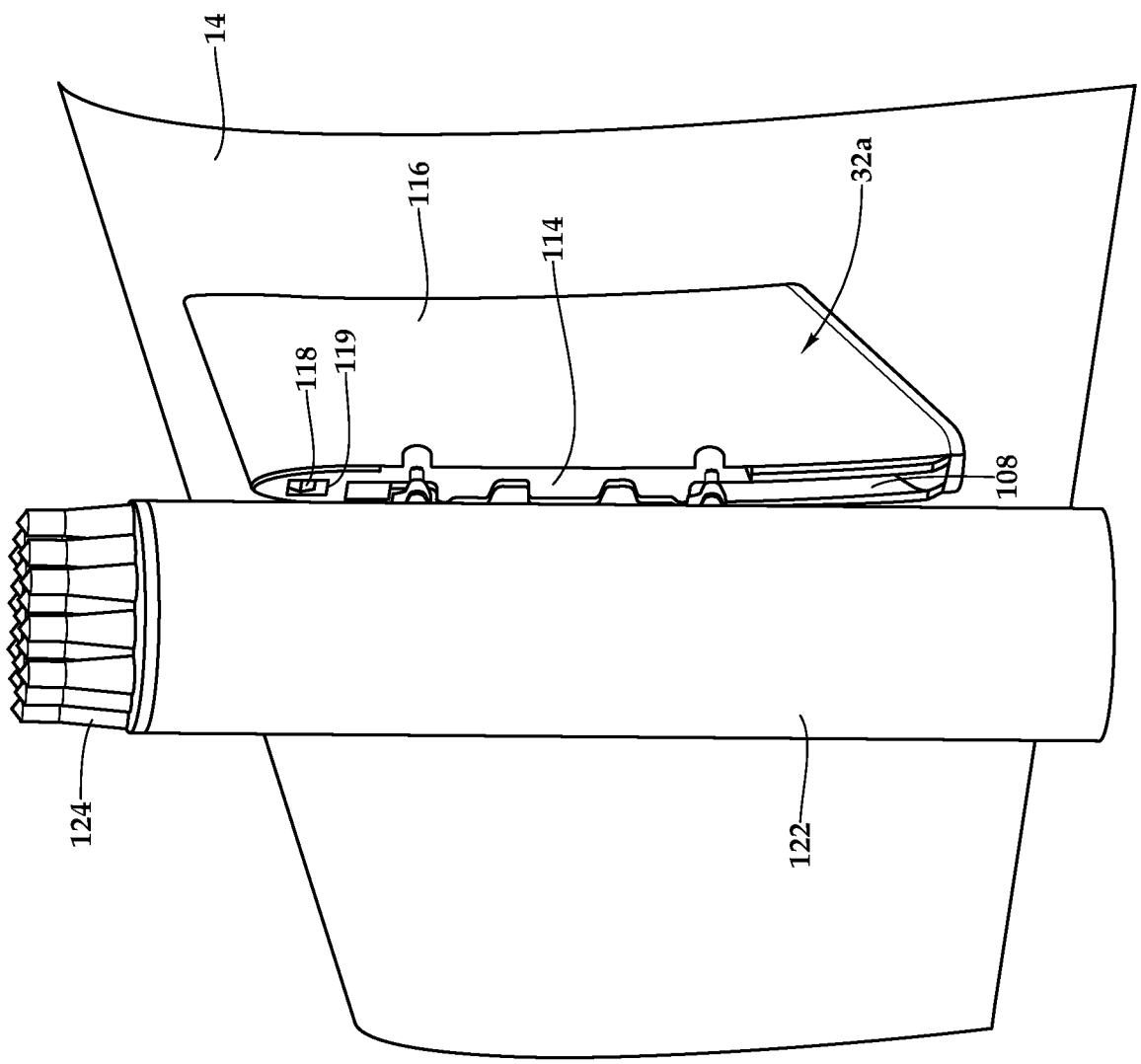
FIGS. 4A-4B are oblique views of a cargo transporting system in retracted mode and in deployed mode, respectively, in accordance with embodiments of the present disclosure.
Figure 4B:
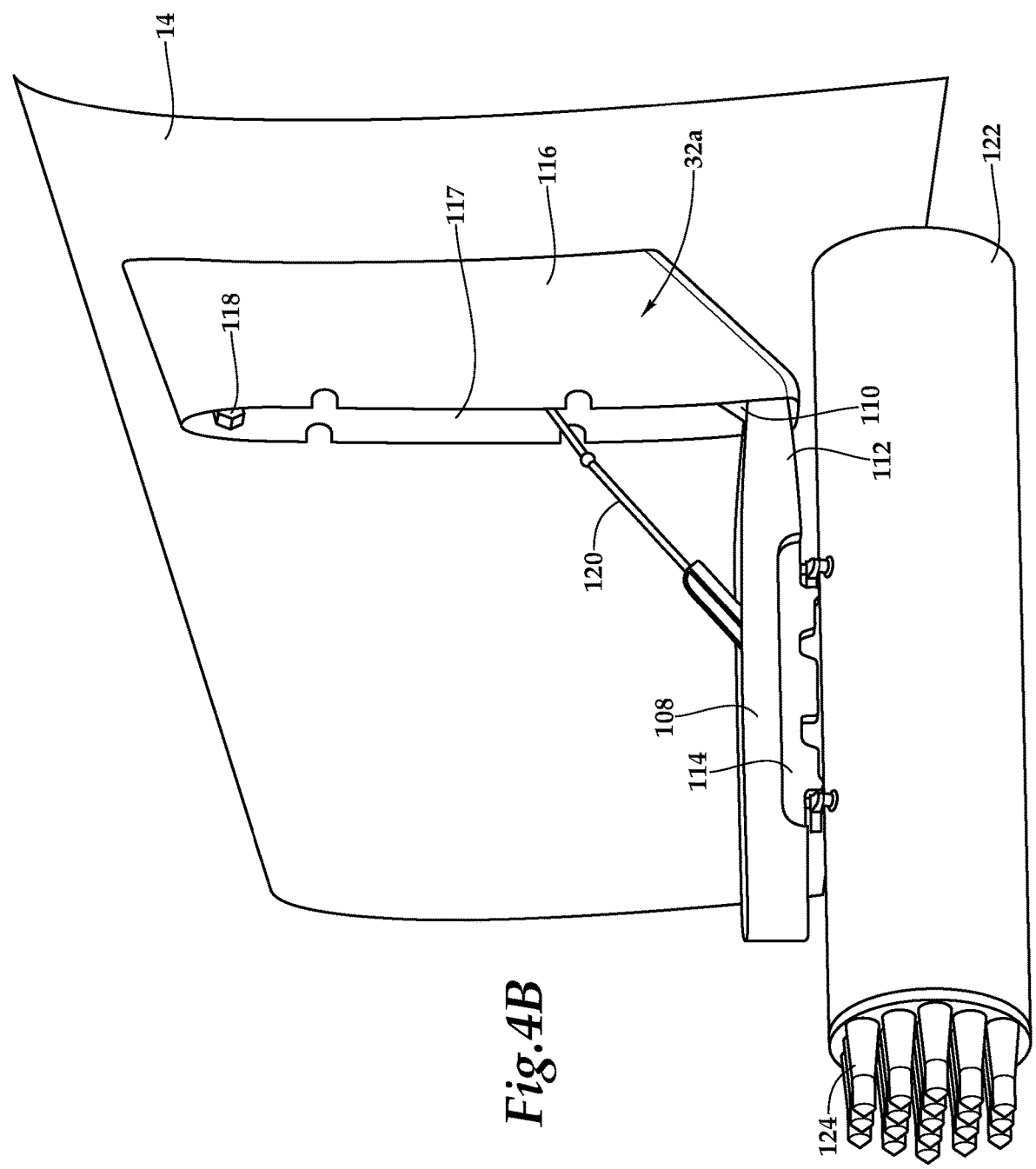

FIGS. 4A-4B illustrate oblique views of the cargo transporting system 32a. Except for the illustrated cargo assembly, the cargo transporting system 32a is substantially similar to cargo transporting system 32b. FIGS. 4A and 4B, respectively, show the cargo transporting system 32a in the retracted and deployed position. Unlike cargo transporting system 32b, cargo transporting system 32a has a cargo assembly in the form of a rocket-pod system 122. The rocket pod system 122 is fixed to the cargo interface 114 and has a cylindrical body that includes a plurality of tubes. The tubes are used to house projectiles in the form of rockets 124 designed to propel themselves from the aircraft 10 to a selected target. The rockets 124 may include fuel systems, guidance systems, explosive ordinances and other elements which are not shown.

Figure 5:
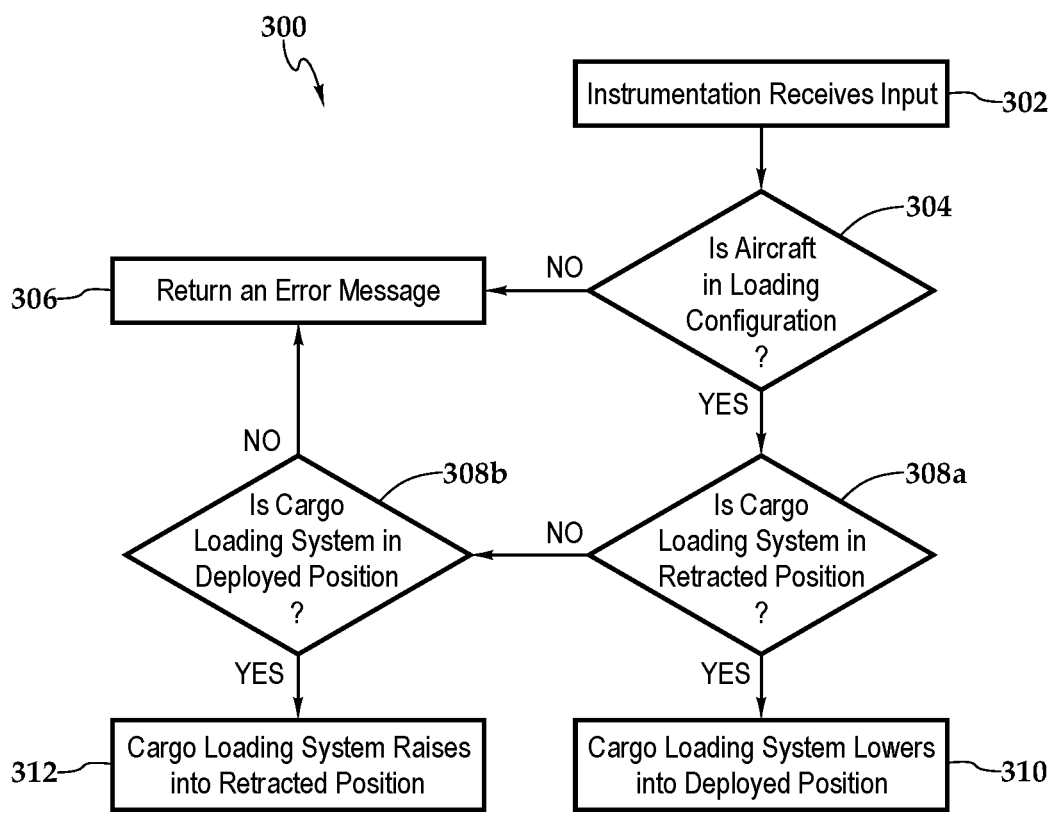
FIG. 5 is a flowchart of a method for deploying and retracting a cargo transporting system in accordance with embodiments of the present disclosure.

Referring to FIG. 5, the aircraft 10 may contain instrumentation that is in mechanical and/or electronic communication with the cargo transporting systems 32a, 32b, wherein the instrumentation can receive an input from either a pilot, ground personnel, a computer and/or an outside electronic or radio signal. Additionally, the aircraft 10 may contain sensors in communication with the instrumentation that can determine whether the aircraft 10 is safely sitting on a surface and is in the loading configuration. FIG. 5 is a flowchart of a method 300 for lowering and raising the cargo transporting systems 32a, 32b using an input to the instrumentation. In step 302 of the method 300, the instrumentation receives an input. In step 304, instrumentation determines whether the aircraft 10 is safely in the loading configuration in response to the received input. In step 306, if the instrumentation determines that the aircraft 10 is not in the loading configuration, it will return an error message and prevent the raising or lowering of cargo transporting system 32a. Alternatively, in steps 308a, 308b, if the instrumentation determines that the aircraft 10 is in the loading configuration, the instrumentation then determines whether the cargo transporting system 32b is in the retracted position or the deployed position. In step 310, if the cargo transporting system 32b is in the retracted position, the cargo transporting system 32b is lowered into the deployed position. Alternatively, if the cargo transporting system 32b is in the deployed position, the cargo transporting system 32b is raised into the retracted position.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A cargo transporting system for a tailsitter aircraft having a wing, the aircraft having a loading configuration in which the aircraft is sitting on a surface with the wing in a substantially vertical orientation, the cargo transporting system comprising:
    a cargo receptacle rotatably coupled to an underside of the wing, the cargo receptacle having a cargo interface; and
    a cargo assembly having a receptacle interface configured for coupling with the cargo interface;
    wherein, in the loading configuration, the cargo transporting system has a deployed position with the cargo receptacle substantially perpendicular to the wing and a retracted position with the cargo receptacle substantially parallel to the wing;
    wherein, in the deployed position, the cargo assembly is connected to the cargo receptacle by coupling the receptacle interface with the cargo interface such that the cargo assembly is substantially perpendicular to the wing; and
    wherein, in the retracted position when the cargo assembly is connected to the cargo receptacle, the cargo assembly is substantially parallel to the wing.

2. The cargo transporting system of claim 1 wherein, in the deployed position, a bottom surface of the cargo receptacle rests above the surface.

3. The cargo transporting system of claim 1 wherein, in the deployed position, a bottom surface of the cargo receptacle rests between two and four feet above the surface.

4. The cargo transporting system of claim 1 wherein the cargo receptacle is configured to be selectively raised and lowered between the retracted and deployed positions.

5. The cargo transporting system of claim 1 further comprising a rotating joint coupling the cargo receptacle to the underside of the wing such that the cargo receptacle is selectively rotatable between the retracted and deployed positions about the rotating joint.

6. The cargo transporting system of claim 5 further comprising an integral tang assembly located at a rear end of the cargo receptacle, the integral tang assembly coupling the cargo receptacle to the rotating joint.

7. The cargo transporting system of claim 5 wherein the rotating joint further comprises a joint lock and wherein, in the deployed position, the joint lock locks the cargo receptacle in a position substantially perpendicular to the wing.

8. The cargo transporting system of claim 1 further comprising a hinged arm coupling the cargo receptacle to the underside of the wing, the hinged arm exerting a force to control a rate at which the cargo receptacle is raised and lowered between the retracted and deployed positions.

9. The cargo transporting system of claim 8 wherein, in the deployed position, the hinged arm supports at least a portion of the weight of the cargo receptacle.

10. The cargo transporting system of claim 1 further comprising a housing structure coupled to the underside of the wing, the housing structure having a housing aperture; and
    wherein, in the retracted position, a top surface of the cargo receptacle is positioned within the housing aperture and a bottom surface of the cargo receptacle is positioned outside the housing aperture.

11. The cargo transporting system of claim 1 further comprising a lock assembly configured to lock the cargo receptacle in a position substantially parallel with the wing.

12. The cargo transporting system of claim 11 wherein the lock assembly further comprises a lock aperture located on the cargo receptacle; and
    a lock mechanism coupled to the underside of the wing;
    wherein, in the retracted position, the lock mechanism interacts with the lock aperture to lock the cargo receptacle in the position substantially parallel with the wing.

13. The cargo transporting system of claim 1 wherein the cargo assembly further comprises a weapons system.

14. A tailsitter aircraft having a loading configuration in which the aircraft is sitting on a surface, the aircraft comprising:
    a wing having a substantially vertical orientation in the loading configuration;
    a pylon coupled to the wing;
    a tail assembly coupled to the pylon and configured to contact the surface in the loading configuration; and
    a first cargo transporting system coupled to the wing, the first cargo transporting system including:
        a first cargo receptacle rotatably coupled to an underside of the wing, the first cargo receptacle having a first cargo interface; and a first cargo assembly having a first receptacle interface configured for coupling with the first cargo interface;

wherein, in the loading configuration, the first cargo transporting system has a deployed position with the first cargo receptacle substantially perpendicular to the wing and a retracted position with the first cargo receptacle substantially parallel to the wing;

wherein, in the deployed position, the first cargo assembly is connected to the first cargo receptacle by coupling the first receptacle interface with the first cargo interface such that the first cargo assembly is substantially perpendicular to the wing; and wherein, in the retracted position when the first cargo assembly is connected to the first cargo receptacle, the first cargo assembly is substantially parallel to the wing.

15. The tailsitter aircraft of claim 14 further comprising:

a second cargo transporting system coupled to the wing, the second cargo transporting system including:

a second cargo receptacle rotatably coupled to the underside of the wing, the second cargo receptacle having a second cargo interface;

a second cargo assembly having a second receptacle interface configured for coupling with the second cargo interface; and wherein, in the loading configuration, the second cargo transporting system has a deployed position with the second cargo receptacle substantially perpendicular to the wing and a retracted position with the second cargo receptacle substantially parallel to the wing;

wherein, in the deployed position, the second cargo assembly is connected to the second cargo receptacle by coupling the second receptacle interface with the second cargo interface such that the second cargo assembly is substantially perpendicular to the wing;

wherein, in the retracted position when the second cargo assembly is connected to the second cargo receptacle, the second cargo assembly is substantially parallel to the wing; and wherein, the first and second cargo transporting systems are symmetrically oriented on the wing.

16. The tailsitter aircraft of claim 15 wherein the first and second cargo receptacles are configured to be selectively raised and lowered between the retracted and deployed positions.

17. The tailsitter aircraft of claim 15 wherein the first and second cargo transporting systems are configured to simultaneously raise and lower the respective first and seconds cargo receptacles between the retracted and deployed positions.

18. The tailsitter aircraft of claim 15 wherein a bottom surface of each of the first and second cargo receptacles rests between two and four feet above the surface in the deployed positions.

* * * * *